United States Patent Office 3,609,817
Patented Oct. 5, 1971

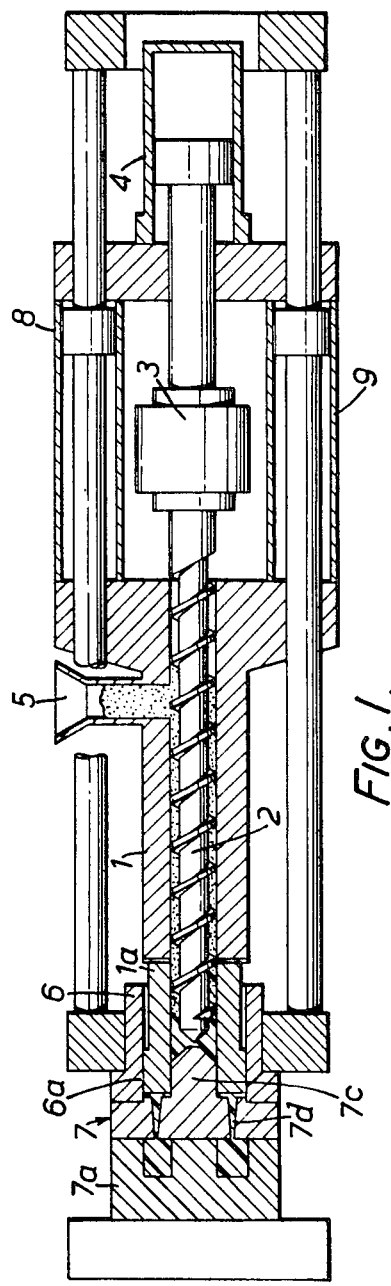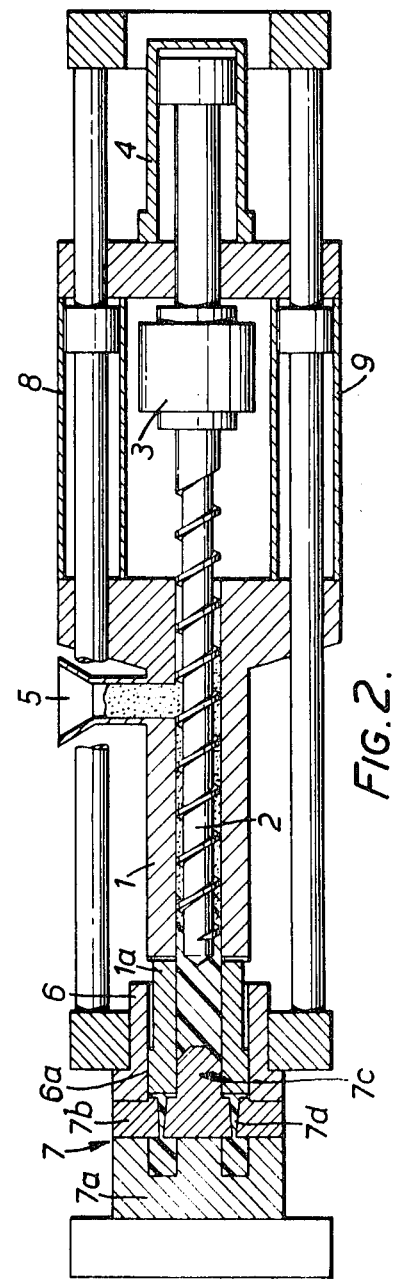

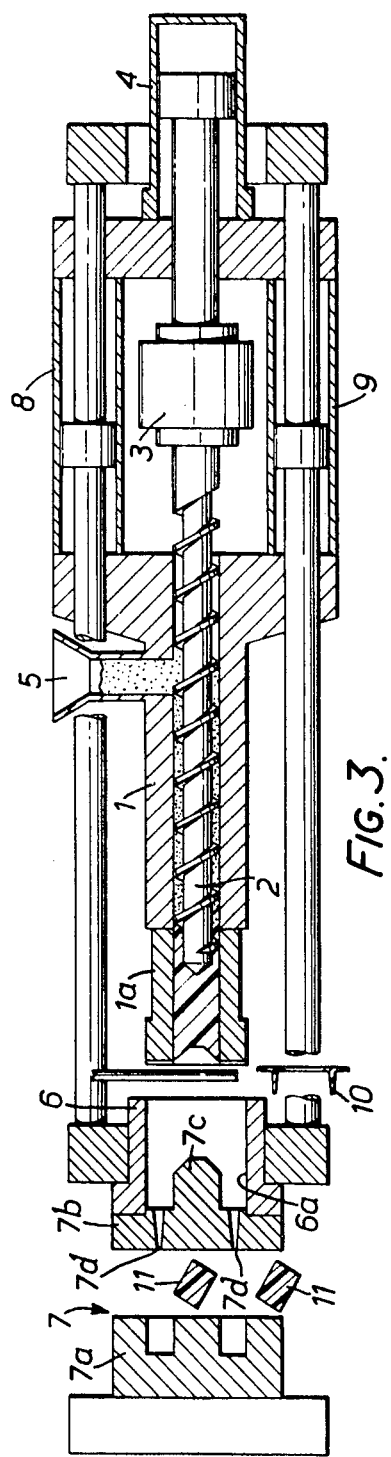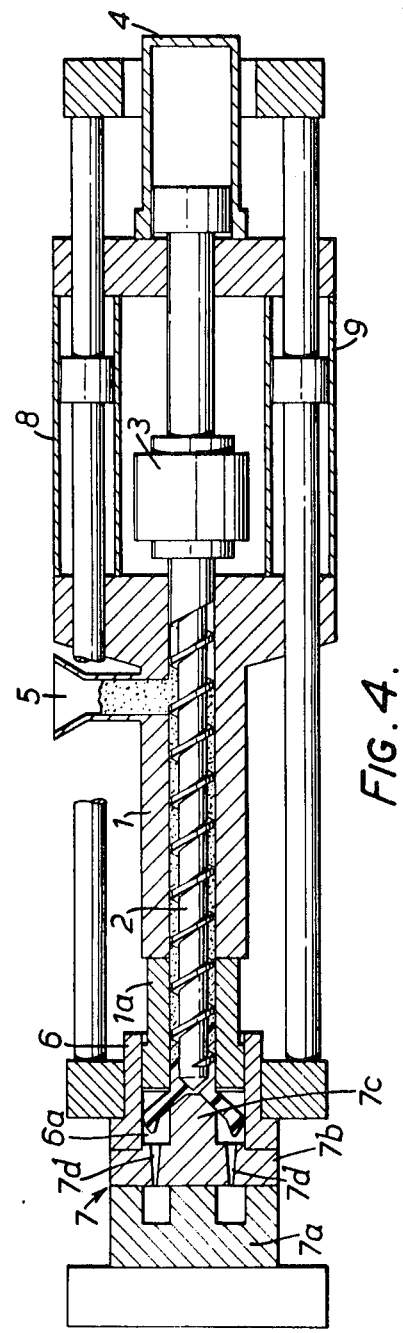

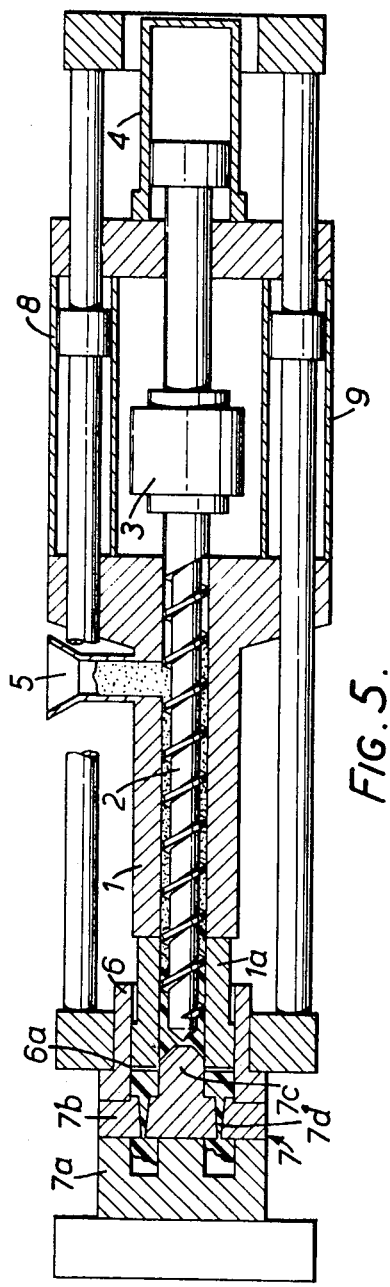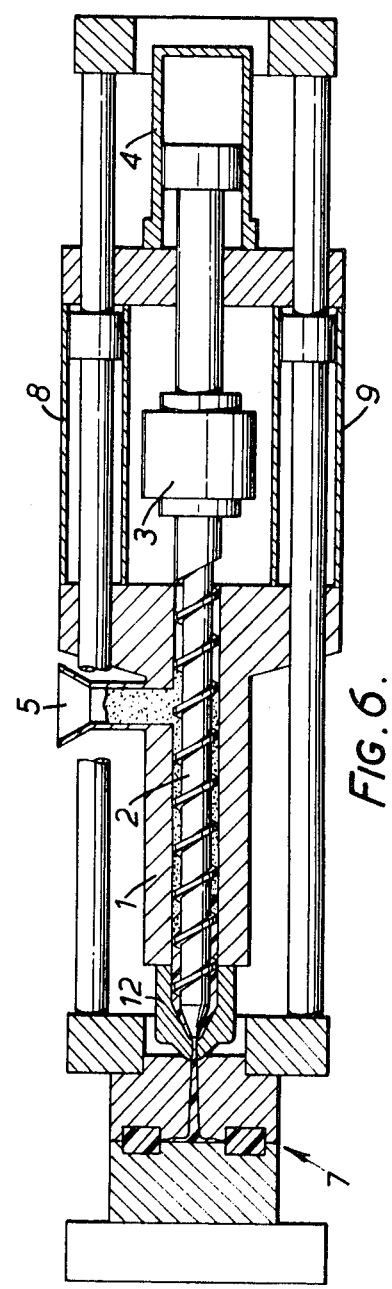

3,609,817
MOULDING APPARATUS FOR THERMOSETTING PLASTICS MATERIAL
Rolf Deerberg, Berenbusch, and Hans-Lothar Kienbaum, Minden, Westphalia, Germany, assignors to Drabert Sohne, Minden, Westphalia, Germany
Filed Sept. 24, 1969, Ser. No. 860,763
Claims priority, application Germany, Apr. 16, 1969, P 19 19 262.2
Int. Cl. B29f 1/06
U.S. Cl. 18—30 AH  2 Claims

ABSTRACT OF THE DISCLOSURE

Moulding apparatus for thermosetting plastics material comprises a plasticizing and feed screw movable axially within a cylinder. The plastics material is discharged by the screw from one end of the cylinder into an annular-section injection transfer chamber which communicates with a mould through a number of discharge nozzles. The end of the cylinder is arranged to enter the annular-section chamber to compress the plastics material therein and eject it through the discharge nozzles into the mould. Whilst the cylinder is within the annular-section chamber, the end of the cylinder is closed by a plug member that forms the inner wall of the annular-section chamber thus separating the plastics material within the chamber from the plastics material with the cylinder.

BACKGROUND OF THE INVENTION (1) Field of the invention

The present invention relates to moulding apparatus for thermosetting plastics materials.

(2) Description of the prior art

The present invention is based on transfer moulding utilising the principle of injection moulding. This principle has advantages over the transfer principle. In this process, the mouldings are ejected through conical nozzles. Suitable means are provided whereby the sprue remaining in the nozzle is drawn back and actually pulled away from the face of the moulding. This has the advantage of ensuring that the moulded articles leave the machine sprueless. As with every process, the sprue passages, even with injection moulding, are subject to extra wear, since the constriction of the sprue passages results in a very high flow velocity. In injection moulding machines, the possible remedy is to make the injection nozzles interchangeable, so that the parts most subject to wear are comparatively cheap and can be very quickly and easily renewed.

Direct injection also ensures that, in the first place, the material is not diverted during the injection process and, in the second place, that the flow paths (i.e. purely the nozzle length) are extremely short, so that the pressure drop and the natural heat of friction do not become excessive, and can be accounted for and advantageously utilised.

In the transfer process, on the other hand, the conditions as regards the sprue passages are similar to those in injection moulding. Here too the material is frequently diverted and fed to the moulds over relatively long flow paths. In addition, all the mouldings are joined by the sprues to be separated and freed from sprue according to the size of the feed orifice. The denser the charge, the larger must these orifices be. This drawback can be overcome in the injection process by the use of a number of small-diameter injection points.

In the plasticizing equipment for injection machines proposed hitherto, the screw lies parallel, obliquely, or at right angles to the direction of injection in the injection unit. Charging takes place either by a cord of plastics falling freely down a chute or the like into the injection cylinder or by the plasticizing cylinder being coupled to the injection cylinder, the plastics cord being cut off by the injection plunger. Thus there are always two separate units.

SUMMARY OF THE INVENTION

One object of the invention is to provide an injection moulding press with a pre-plasticizing device which is part of the injection unit, but operates in such a way as to eliminate the drawbacks referred to above. In addition, the plasticizing screw is placed centrally and lies in the direction of injection of the injection unit.

Another object of the invention is to enable the injection and plasticizing unit to be converted, by the replacement of a small number of parts, into the injection unit of a conventional injection moulding machine.

By the achievement of these objects, a machine constructed in accordance with the invention becomes a universal machine and can effect either injection transfer moulding of thermosetting plastics with per-plasticizing or injection moulding of thermoplastics.

According to the invention there is provided moulding apparatus for thermosetting plastics materials comprising, cylinder means, plasticizing screw means, means for rotating said plasticizing screw means within said cylinder means, means for moving said plasticizing screw means axially relative to said cylinder means to feed plastics material through said cylinder means and discharge said plastics material from one end thereof, means defining an injection transfer chamber arranged to be fed with said plastics material discharged from said one end of said cylinder means, plug means within said injection transfer chamber and defining therewith an annular-section chamber, means defining a mould, and means defining a number of discharge passages interconnecting said mould and said annular-section chamber, the said one end of said cylinder means being operable to axially enter said annular-section chamber around said plug means to compress the plastics material within said annular-section chamber and eject said plastics material through said discharge passages into said mould, and the said plug means being operable to separate the said plastics material in the said annular-section chamber from the plastics material in said cylinder means when said one end of said cylinder means is disposed around said plug means.

BRIEF DESCRIPTION OF THE DRAWINGS

An embodiment of the invention will now be described, by way of example, with reference to the diagrammatic drawings in which:

FIGS. 1 to 5 are longitudinal sections, showing moulding apparatus in accordance with the invention through its cycle of operation; and FIG. 6 is a longitudinal section, showing the moulding apparatus of FIGS. 1 to 5 utilised as an injection moulding machine.

DESCRIPTION OF THE PREFERRED EMBODIMENT

As shown in the drawings, the moulding apparatus comprises a cylinder 1 housing a plasticizing screw 2, which can be rotated by means of a suitable drive 3 and which can be moved axially relative to the cylinder 1. The axial movement of the screw 2 together with its drive 3 is effected by hydraulic or other fluid pressure within a cylinder 4 at one end of the screw.

In the form shown, the cylinder comprises a detachable end portion 1a.

The plastics material is fed to the cylinder 1 through a hopper 5.

The cylinder 1 which is independent of the movement of the screw 2 acts as an injection plunger operating in conjunction with an injection transfer cylinder 6, into which it can be inserted. The injection transfer cylinder 6 is connected to one part 7b of a tool 7 having feed nozzles 7d machined therein which discharge into the mould part 7a of the tool.

A plug member 7c is fixed axially within the injection transfer cylinder 6, and the free end of the plug member adjacent the screw 2 is frusto-conical in shape. The plug member 7c and the injection transfer cylinder 6 together form an annular chamber 6a, the axis of which is aligned with the axis of the cylinder 1. The cross-sectional dimensions of the chamber 6a substantially correspond to those of the discharge end of the cylinder 1, which end can enter the chamber 6a. For this purpose the injection transfer cylinder 6 can be moved axially relative to the cylinder 1, independently of the screw 2 by hydraulic or other fluid pressure within cylinders 8 and 9.

The mode of operation of the apparatus is as follows:

At the end of an injection process, the various parts of the device occupy the positions shown in FIG. 1. In this particular position, the hardening of the material in the mould part 7a has begun.

At the end of a variable delay period, but within the hardening period of the material within the mould part, the plasticizing of the following charge commences, the screw 2 being moved to the position shown in FIG. 2. The plasticizing takes place against the plug member 7c, while the measured feed of the screw 2 takes place on the familiar screw plunger principle.

At the end of the hardening period, the cylinder 1 is withdrawn from the injection transfer cylinder 6 as shown in FIG. 3, and the mould part 7a of the tool 7 is opened to facilitate removal of the mouldings 11. A sprue disc 10 attached to the end face of the end portion 1a by means of dovetail-sectioned grooves, for example, is also withdrawn from the cylinder 6 upon the withdrawal of the cylinder 1 and can then readily be removed, the mouldings thus being free from sprues.

The tool 7 is then closed again, whilst the cylinder 1 and the screw 2 move relatively towards the tool 7. As this relative movement takes place, an annular gap is formed between the frusto-conical end of the plug member 7c and the end face of the end portion 1a of the cylinder 1, and plastic material is forced through this gap, by axial movement of the screw 2, into the annular chamber 6a in the injection transfer cylinder 6 to be distributed uniformly throughout the chamber 6a (FIG. 4).

As the cylinder 1 progresses into the transfer cylinder 6 the chamber 6a steadily diminishes in size, until finally the material therein is completely separated and cleared from the material in the cylinder 1. In the terminal position, the screw 2 abuts against the plug member 7c.

When the cylinder 1 progresses further into the transfer cylinder 6 the plastic material, within the chamber 6a is injected into the mould part 7a through the feed nozzles 7d, (as shown in FIG. 5). During this injection process plasticizing of the following charge can begin.

FIG. 6 shows how, by replacing the end portion 1a by an injection nozzle 12, the apparatus can be converted into an injection moulding machine.

The mode of operation of the injection moulding process being well known, it need not be explained here in detail.

In the apparatus described herein, the pressure of the screw need be only as great as is needed for the division of the charge of plastics material at the plug member. The screw is thus completely unstressed during the actual injection process. Moreover, plasticizing can begin while injection is still in progress.

Because the injection plunger, as part of the plasticizing cylinder, is annular in cross-section, a relatively large number of moulds can be injected with the plastics material.

What is claimed is:

1. Moulding apparatus for thermosetting plastics materials comprising,
    cylinder means,
    plasticizing screw means,
    means for rotating said plasticizing screw means within said cylinder means,
    means for moving said plasticizing screw means axially relative to said cylinder means to feed plastics material through said cylinder means and discharge said plastics material from one end thereof,
    means defining an injection transfer chamber arranged to be fed with said plastics material discharged from said one end of said cylinder means,
    plug means for the said one end of said cylinder means fixedly mounted within said injection transfer chamber and defining therewith an annular-section chamber, the axis of said annular-section chamber being aligned with the axis of said cylinder means, and the cross-sectional dimensions of said annular-section chamber substantially corresponding to those of said one end of said cylinder means,
    means defining a mould,
    means defining a number of discharge passages interconnecting said mould and said annular-section chamber, and
    means for axially moving said cylinder means relatively towards said annular-section chamber so that said one end of said cylinder means axially enters said annular-section chamber around said plug means to compress the plastics material within said annular-section chamber and eject said plastics material through said discharge passages into said mould.

2. Moulding apparatus according to claim 1 wherein the said plug means defines stop means limiting axial movement of said plasticizing screw means within said cylinder means.

References Cited

FOREIGN PATENTS 1,297,068  5/1962  France.

J. SPENCER OVERHOLSER, Primary Examiner

N. E. LEHRER, Assistant Examiner

U.S. Cl. X.R.

18—30 AM